United States Patent

[11] 3,597,027

[72] Inventor Walter B. Herndon
 Ann Arbor, Mich.
[21] Appl. No. 803,284
[22] Filed Feb. 28, 1969
[45] Patented Aug. 3, 1971
[73] Assignee General Motors Corporation
 Detroit, Mich.

[54] THRUST BEARING
 9 Claims, 6 Drawing Figs.
[52] U.S. Cl............................................................ 308/160
[51] Int. Cl.......................................................... F16c 17/06
[50] Field of Search........................................... 308/163, 160

[56] References Cited
UNITED STATES PATENTS

| | | | |
|---|---|---|---|
| 2,306,048 | 12/1942 | Fast............................. | 308/160 |
| 2,737,423 | 3/1956 | Zeidler........................ | 308/163 |
| 1,664,878 | 4/1928 | Flintermann................ | 308/160 |
| 1,494,010 | 5/1924 | Newhouse.................... | 308/160 |

Primary Examiner—Martin P. Schwadron
Assistant Examiner—Frank Susko
Attorneys—E. W. Christen, A. M. Heiter and John P. Moran ABSTRACT: A thrust bearing having a plurality of radially extending lubrication grooves formed on the bearing face thereof, and shallow, radially extending relief sections formed on the other face thereof, directly opposite and wider than the lubrication grooves.

PATENTED AUG 3 1971

3,597,027

INVENTOR.
Walter B. Herndon
BY
a. M. Heiter
ATTORNEY

THRUST BEARING

This invention relates generally to thrust washers or bearings and more particularly to a thrust bearing including novel means for preventing failure due to high unit loading on the raised radial edge portions resulting from the displacement of metal during formation of lubrication grooves on the bearing face thereof.

We have found that the formation of lubrication or other grooves on flat metal surfaces by various forming methods, such as coining or stamping, displaces the metal involved and results in metal protrusions being formed adjacent the edges of the lubrication grooves. Unless the protrusions are first ground off, once the thrust bearing is located in an assembly, such as adjacent the inner race of a clutch mechanism of an automatic transmission, the life of the thrust bearing is reduced due to the loading being carried by the raised metal portions, rather than by substantially the entire area of the bearing.

Accordingly, a primary object of this invention is to provide a thrust bearing, including novel means for preventing failure due to the above-described condition.

Another object of the invention is to provide a thrust bearing wherein the likelihood of failure as a result of high unit loading is substantially lessened.

A more specific object of the invention is to provide a thrust bearing wherein a shallow recessed portion is formed opposite and wider than each groove, such as a lubrication groove, which is formed on the bearing face thereof, in order to allow a deflection under load conditions of that portion of the bearing which contains raised metal protrusions adjacent the grooves, the deflection being into the recessed areas.

These and other objects of the invention will become more apparent when reference is made to the following specification and accompanying drawings wherein.

Figure 1:
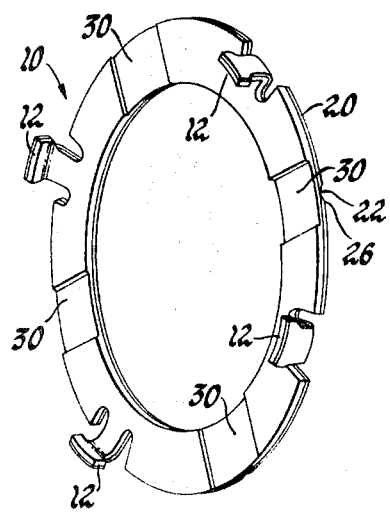
FIG. 1 is a perspective view of a thrust bearing embodying the invention.
Figure 2:
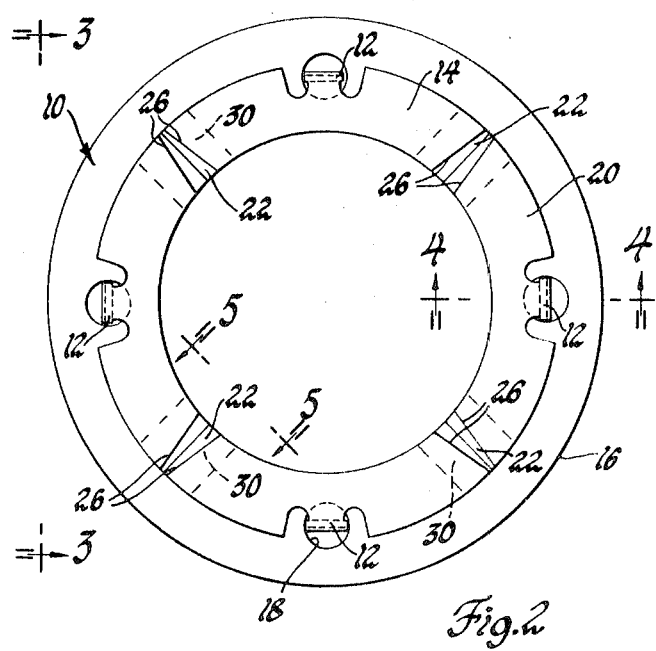
FIG. 2 is a plan view of the thrust bearing illustrated in FIG. 1.
Figure 3:
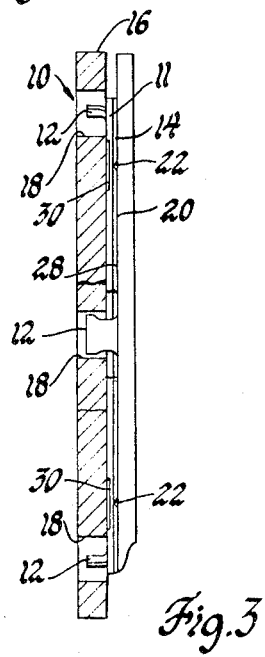
FIG. 3 is a side elevational view taken along the plane of line 3-3 of FIG. 2, and looking in the direction of the arrows, but with the thrust bearing positioned between a driving member and a nonrotating surface.
Figure 4:
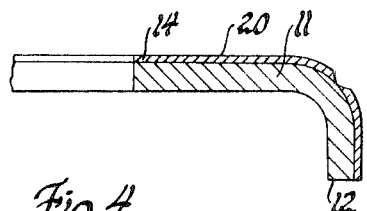
FIG. 4 is an enlarged cross-sectional view taken along the plane of the line 4-4 of FIG. 2, and looking in the direction of the arrows.

Referring now to the drawings in greater detail, FIGS. 1, 2 and 3 illustrate a typical thrust bearing 10 on which four (4) equally spaced tabs or tangs 12 are formed, pointing away from the bearing face 14 thereof, to provide means for rotating the bearing 10 by an accompanying rotating or driving member 16, which may be a bearing race or other assembly which subjects the bearing 10 to considerable load. The tangs 12 extend into openings 18 formed in the member 16. The bearing 10, which may consist of any suitable material, such as a steel backing 11 with a layer of bronze bonded thereto to form the bearing surface 14, may be plated with a layer of tinplate 20, if desired, for a lower coefficient of friction.

Figure 5:
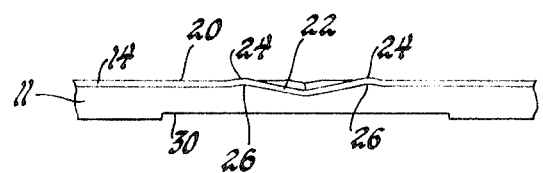
FIG. 5 is an enlarged cross-sectional view taken along the plane of the line 5-5 of FIG. 2, and looking in the direction of the arrows.

Equally spaced lubrication grooves 22 (FIGS. 2 and 5) are formed on the bearing surface 14 prior to plating, by any suitable means, such as stamping or coining. The grooves 22 have very wide V-sections so they terminate at their edges 26 in very small wedge angles for forcing oil between the bearing surfaces 20 and 28. The grooves 22 also taper from a large section at the inner radius, permitting the entry of a large volume of oil, to a smaller section at the outer radius to reduce the flow volume and pressurize the oil in the grooves due to the centrifugal force effect. The stamping or other groove-forming process causes a displacement of metal resulting in the formation of radially extending raised portions 24 (FIG. 5) adjacent the edges 26 of the grooves 22.

As a result of the raised portions 24 of displaced metal, it is apparent that the overall flatness of the bearing surface 14 and/or the plated layer 20 will be disrupted, and when the thrust bearing 10 is assembled with its bearing surface 14 or 20 against a mating nonrotating member or surface 28 (FIG. 3), there will result a condition wherein the entire load will be supported by the raised portions 24 adjacent the edges 26 of the lubrication grooves 22, rather than having the load distributed over substantially the entire bearing surface 14 or 20, as it rotates against the member 28. Experience indicates that, prior to the formation of shallow, radially extending recesses 30 on the back side of the thrust bearing 10 directly opposite the grooves 22, and so long as the raised portions 24 have not been removed by a separate machining operation, the very high unit loading (curve A, FIG. 6) on the raised portions 24 on each side of the grooves 22 prematurely wears through the low coefficient of friction-plated material 20 thereon. This causes an increased drag on the bearing 10, increased heat, scoring and reduced life of the bearing 10.

The recesses 30 are preferably formed in the same stamping or coining operation as the grooves 22. It has also been found that, when these recesses 30 are provided on the side opposite the lubrication grooves 22, the raised portions 24 may be reduced or eliminated by displacing the metal into the recesses, but that it is difficult to maintain the die condition which would completely eliminate the raised portions 24 during a production run. This thrust washer construction provides significantly improved and more consistent characteristics of operation and durability though raised portions 24 of varying degrees are present at the edges 26 of the lubrication grooves 22. It is essential that the recesses 30 be circumferentially wider than the oppositely disposed lubrication grooves 22. The recesses 30 are shallow, say, 0.001 to 0.003 inch deep, in order to not excessively weaken the bearing 10, but sufficient to provide controlled flexibility and to permit a small controlled deflection of the bearing 10 in the vicinity of the grooves 22 under load on the raised portions 24. This, of course, permits the entire surface 14, or, if plated, the surface 20, to come into contact with and rotate against the surface of the adjacent stationary member 28. The use of the recesses 30 permits the naturally formed raised portions 24 to remain, permitting an initial out-of-flatness condition which becomes unimportant after assembly due to the now inherent deflection characteristic. If desired, the recesses 30 may be formed in the adjacent surface of the member 16, which rotates with the bearing, and the thrust washer can have a thickness providing controlled deflection at the lubrication grooves 22 opposite the unsupported portion over the recesses 30.

Figure 6:
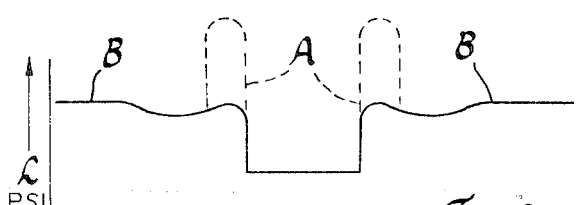
FIG. 6 is a graphic representation of a characteristic of the invention.

It is believed that thrust washers with wide V-section lubrication grooves still wipe too much oil from the facing bearing surface, and when there are raised portions at the edges of the grooves, this undesirable condition is greatly increased; and furthermore, there is a localized high unit load at the edges of each groove relative to the normal load on the remainder of the bearing surface, as generally indicated by curve A in FIG. 6. The improved and more consistent characteristics of operation and durability of thrust washers made according to this invention significantly reduce the unit load at the edges of the grooves, particularly when there are raised portions at the edges of the grooves, and this increases the flow of lubricant from the grooves for distribution circumferentially between the bearing surfaces. The degree of flexibility over the recesses controls and limits the unit load at the edges of the lubrication grooves to a predetermined value and preferably provides a unit load at the edges of the lubrication grooves of a reduced value which is substantially equal to, or less than, a normal operating unit load on the remainder of the bearing surface 14 or 20. This construction prevents high localized unit loads at and adjacent the edges of the lubrication grooves which result in the wiping of the lubricant from the bearing surface and localized overheating. The substantially equal unit load arrangement with a thrust bearing having raised portions at the edges of the lubrication grooves is theoretically illustrated in curve B, FIG. 6, and provides very uniform wear over the entire bearing surface for increased capacity. Further reduction of the unit load at the edges of the lubrication grooves to a value less than the unit load on the remainder of the bearing surface will further increase the flow of lubricant between the bearing surfaces for increased cooling and load-carrying capacity of the remainder of the bearing providing an overall increase in capacity.

It should be apparent that the thrust bearing described above embodies a novel feature which permits lubrication grooves to be formed thereon without producing a localized increased load condition, but which provides improved lubrication and improved distribution of the unit load for greatly increased bearing life.

It should be further apparent that the invention embodies a feature which is simple and inexpensive to manufacture and yet highly efficient in operation.

While but one embodiment and application of the invention has been shown and described, it should be apparent that other modifications and applications thereof are possible.

I claim:

1. In an assembly of the type described, a pair of operating members having facing planar member surfaces, means mounting said members for relative movement longitudinally of said planar surfaces and for applying a thrust load to one member to urge it in a direction transverse to said planar surfaces toward the other member, a thrust bearing member positioned between said planar member surfaces and having opposite planar bearing surfaces, one bearing surfaces being in contact with one member surface and the other opposite bearing surface being in contact with the other member surface, at least one lubrication groove formed in said thrust bearing member at one bearing surface with small raised portions on said one bearing surface immediately adjacent said groove resulting from the displacement of material during the formation of said groove, recess means formed in said other surface of said thrust bearing means fixed at the region about said groove during operation to provide room for displacement of said thrust bearing member in said region under load, and said thrust bearing member having sufficient flexibility in the region at said groove and raised portion to permit deflection of said region of said thrust bearing member so said raised portion is deflected into the plane of said one bearing surface under normal operating load to reduce the unit load on said raised portions, said thrust bearing remaining within the bounds of said facing planar member surfaces.

2. An assembly of the type described comprising a pair of relatively rotating members having substantially flat oppositely disposed faces, a thrust bearing confined between said members, means nonrotatably connecting said thrust bearing to one of said members for causing said thrust bearing to rotate relative to the other of said members, a bearing surface formed on said thrust bearing for rotational sliding engagement with said other member, at lest one lubrication groove formed on said bearing surface with raised portions along the edges of said groove resulting from the transfer of metal during the formation of said groove, and recess means formed on said thrust bearing oppositely disposed from said lubrication groove for permitting deflection of said thrust bearing within the bounds of said substantially flat oppositely disposed faces, and said thrust bearing having flexibility for deflection under load on the raised portions of said thrust bearing adjacent both edges of said groove to substantially reduce the unit load on said raised portions to a value compatible with the unit load on the remainder of said bearing surface.

3. The invention defined in claim 2, and said unit load on said raised portions being limited to a predetermined value.

4. The invention described in claim 2, and said unit load being equal to or less than the unit load on the remainder of said bearing surface under normal operating conditions.

5. The invention described in claim 4, wherein said lubrication groove is a wide V-groove extending radially across said bearing surface and said recess means being a radial recess wider than said groove and on the thrust bearing opposite said groove.

6. The thrust bearing described in claim 3, and said thrust bearing having sufficient flexiblity in said region so the unit load at said edges is less than the unit load on the remainder of said bearing surface.

7. A thrust bearing comprising a metal disc, a bearing surface formed on one face of said metal disc, a plurality of radially extending lubrication grooves formed on said bearing surface, a raised portion of displaced metal formed adjacent each edge of each lubrication groove, and a radially extending recessed portion formed on the other face of said metal disc directly opposite each of said lubrication grooves and each adjacent pair of said raised portions for permitting deflection of said raised portions toward said recessed portions to reduce the load on said raised portions when said bearing surface is subjected to normal load conditions, the depth of said recessed portion being greater than the height of said raised portion and the width of said recessed portion being sufficient to permit the deflected portions to enter and remain within the planes of said faces of said metal disc.

8. The thrust bearing described in claim 7, and said unit load on said raised portions being limited to a predetermined value.

9. A bearing assembly comprising a first member and a second member mounted for relative rotation and each member having a substantially flat face facing the other member, a thrust bearing between said substantially flat faces of said members, means nonrotatably connecting said thrust bearing to said first member for causing said thrust bearing to rotate relative to said second member, said thrust bearing having a bearing surface in rotational sliding engagement with said face of said second member and an opposite surface in nonrotational engagement with said face of said first member, at least one lubrication groove formed radially across said bearing surface, and recess means formed on said thrust bearing oppositely disposed from said lubrication groove for permitting deflection under load of said thrust bearing in the region of and adjacent both edges of said groove, said thrust bearing in the region of said groove being flexible under normal operating loads for deflection into said recess means intermediate said substantially flat faces to substantially reduce the unit load at said edges of said groove, said lubrication groove being a wide V-groove extending radially across said bearing surface tapering from a larger open section at the inner radius of said thrust bearing to a smaller open section at the outer radius of said thrust bearing for permitting the entry of a large volume of lubricating fluid at said inner radius and reducing the flow volume and pressurizing said fluid en route to said outer radius due to the action of centrifugal force.